United States Patent
Froc

(10) Patent No.: US 7,933,317 B2
(45) Date of Patent: Apr. 26, 2011

(54) METHOD FOR TRANSMITTING UWB PULSE SEQUENCES IN A COST-EFFICIENT MANNER

(75) Inventor: Gwillerm Froc, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 865 days.

(21) Appl. No.: 11/366,407

(22) Filed: Mar. 3, 2006

(65) Prior Publication Data

US 2006/0198425 A1 Sep. 7, 2006

(30) Foreign Application Priority Data

Mar. 7, 2005 (EP) .................................. 05290512

(51) Int. Cl.
*H04B 1/38* (2006.01)
(52) U.S. Cl. ........ 375/219; 375/220; 375/243; 375/271; 375/316; 375/342; 455/118; 455/522
(58) Field of Classification Search .......... 375/135–137, 375/144–148, 219, 220, 224, 242–245, 259, 375/295, 306, 130, 316, 342–343, 345, 350, 375/150, 299; 455/118, 130, 522
See application file for complete search history.

(56) References Cited

U.S. PATENT DOCUMENTS

| | | | | |
|---|---|---|---|---|
| 4,945,567 A * | 7/1990 | Ozawa | ........................... | 704/223 |
| 6,457,364 B1 * | 10/2002 | Howell | ........................... | 73/602 |
| 6,788,730 B1 | 9/2004 | Richards et al. | | |
| 7,710,320 B2 * | 5/2010 | Fullerton et al. | .............. | 342/387 |
| 7,756,487 B2 * | 7/2010 | Lerner et al. | .................... | 455/76 |
| 7,848,456 B2 * | 12/2010 | Merz et al. | ..................... | 375/310 |
| 2004/0136438 A1 * | 7/2004 | Fullerton et al. | .............. | 375/130 |
| 2004/0171957 A1 * | 9/2004 | Farserotu et al. | ............. | 600/509 |
| 2004/0258133 A1 * | 12/2004 | Lee et al. | ....................... | 375/130 |
| 2005/0031043 A1 * | 2/2005 | Paquelet | ........................ | 375/259 |
| 2005/0206446 A1 * | 9/2005 | Shimazaki et al. | ............ | 329/313 |
| 2006/0091894 A1 * | 5/2006 | Jean et al. | ....................... | 324/644 |
| 2008/0111686 A1 * | 5/2008 | Hall et al. | ....................... | 340/552 |
| 2008/0285663 A1 * | 11/2008 | Fischer | ......................... | 375/259 |

FOREIGN PATENT DOCUMENTS

EP 0 682 425 A2 11/1995

OTHER PUBLICATIONS

U.S. Appl. No. 11/366,400, filed Mar. 3, 2006, Froc et al.

* cited by examiner

*Primary Examiner* — Shuwang Liu
*Assistant Examiner* — Hirdepal Singh
(74) *Attorney, Agent, or Firm* — Oblon, Spivak, McClelland, Maier & Neustadt, L.L.P.

(57) ABSTRACT

A telecommunications transmitting device, including: an encoder configured to generate an initial signal formed by at least one reference sequence including an initial integer number of pulses dispatched over a same integer number of time windows; a transmitter configured to transmit the initial signal to a receiver; a demodulation device configured to determine that no acknowledgement from the receiver in response to the initial signal is received; and a processing unit configured to tune a second integer number of pulses constituting a second reference sequence, the second integer number being larger than the initial integer number, wherein the transmitter is configured to transmit a second signal formed by the second reference sequence including the second integer number of pulses dispatched over a same integer number of time windows.

6 Claims, 4 Drawing Sheets

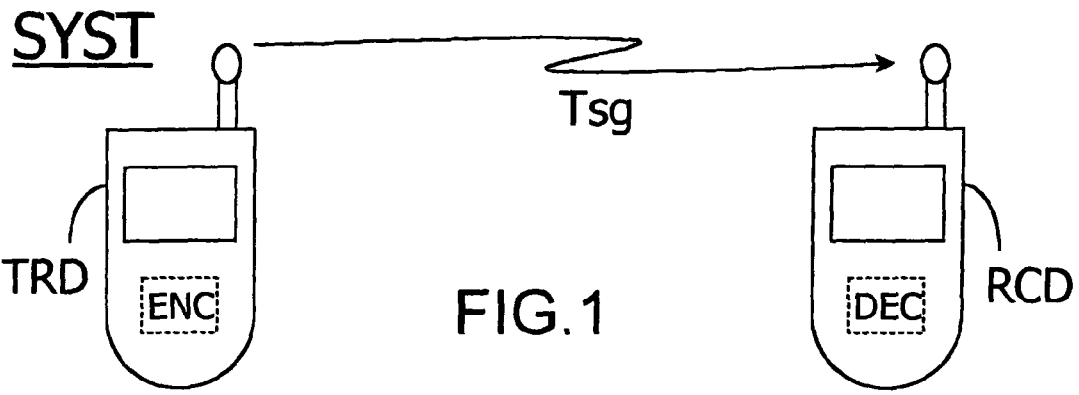
FIG.1
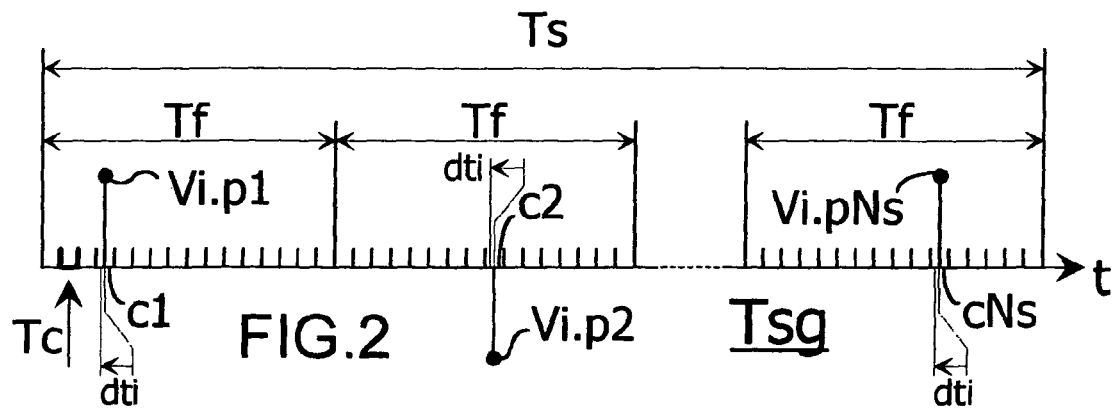
FIG.2
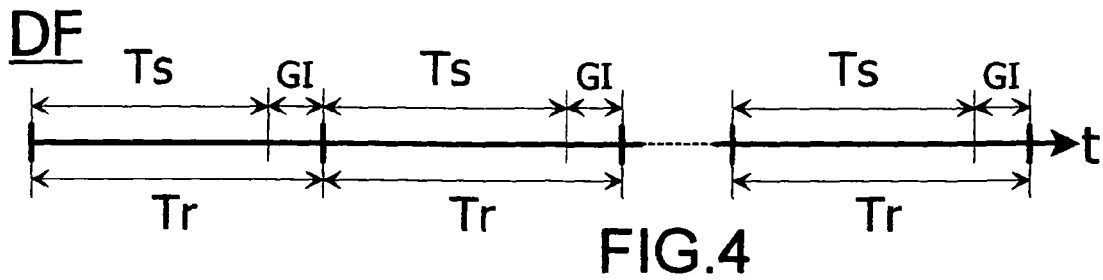
FIG.3
FIG.4

US 7,933,317 B2

METHOD FOR TRANSMITTING UWB PULSE SEQUENCES IN A COST-EFFICIENT MANNER

FIELD OF THE INVENTION

The present invention relates to a method for transmitting data in a telecommunication system including at least one transmitter and one receiver, said transmitter being intended to transmit a carrying signal formed by at least one reference sequence including an integer number of pulses dispatched over a same integer number of time windows.

DESCRIPTION OF RELATED ART

Such data transmission methods are currently studied with the aim of assessing the relevance of so-called Ultra-Wide Band telecommunication systems (further referred to as UWB systems). In such a system, each pulse of the reference sequence is enclosed within a time chip whose position within its relevant time window is defined by a chip number, so that each transmitter may be identified by a signature formed by the above-mentioned chip numbers. In the present state of the art, the number of the pulses and their position within a given reference pulse sequence is thus only used for signal differentiation purposes.

The pulses used in UWB systems are very short, having for example a duration lower than 0.1 nanosecond, which offers to such systems bandwidths at least as large as 10 GigaHertz, entailing high flexibility and hence numerous possible applications for such systems.

Information can be encoded and transmitted by performing a modulation of the above-described carrying signal. The inventors have observed that, because of the shortness of the pulses involved, a precise synchronization with a given pulse sequence will be difficult to perform at the receiver end, so that a detection scheme involving as few time-related parameters as possible should be used for detecting a transmitted signal, in order for said detection scheme to be cost-efficient.

BRIEF SUMMARY OF THE INVENTION

The present invention thus aims at providing an UWB telecommunication system with a realistic and efficient transmission and reception scheme, according to which scheme information carried by pulse sequences may be identified as such and recovered at the receiver end without said receiver having to map precisely, with respect to time, the received pulse sequences, and, more generally, by spending as little time and processing power as possible for performing the demodulation of a received signal.

Indeed, a method for transmitting data as described in the opening paragraph is characterized according to the invention in that it includes at least one signal detection step to be executed at the receiver end, in the course of which signal detection step at least one detection value representative of an amount of power carried by a received signal is computed and compared to at least one predetermined threshold value, method according to which the integer number of pulses included in any given reference sequence is tunable.

The signal detection step according to the invention enables to differentiate a signal actually transmitted from noise generally affecting any given communication channel, by quantifying the power of the received signal and performing simple comparisons with one or several threshold values, which comparisons are easy to implement. Such a demodulation scheme does not require the receiver to perform a precise mapping, with respect to time, of the received signal, which in turn enables to manufacture adapted receivers at a relatively low cost.

Furthermore, since the physical property to be used for identifying the informational content of a received signal is a quantity of energy carried by said signal, as perceived at the receiver end, the inventors have observed that physical phenomena affecting a wireless link established between a transmitter and a receiver would have an impact on the receiver's ability to detect incoming information. A link featuring a strong noise or a long distance will most certainly produce a significant attenuation and/or distortion of the signal transmitted through it, which means that the energy carried by said signal will be more difficult to detect and quantify than that carried by a signal transmitted through a low-noise, short distance channel, and will thus require the use of a higher number of pulses within the reference pulse sequence in accordance with the present invention. The fact that the number of pulses included in the reference pulse sequence may be tuned will enable to optimize the detection and decoding-process to be carried out for analyzing the received sequences with respect to any current configuration of the telecommunication system. This number of pulses included in the reference pulse sequence may for example be pre-set at a relatively small initial value and be increased if a distance separating the transmitter and the receiver widens, whereas using a single and constant number of pulses would command to select a large, worst-case value for said number, which would then also be used even if the transmitter and the receiver were close to each other, thus leading to longer computations and unnecessary spending of processing power.

This is particularly true for a synchronization step which is to take place at the very beginning of a communication between the transmitter and the receiver. Indeed, the inventors have observed that the computing time necessary for scanning a received signal in search of the beginning of a reference sequence including a given number Ns of pulses is proportional to the square value $(Ns)^2$ of said given number Ns, so that said number of pulses should be kept as low as possible.

By virtue of the invention, the number of pulses included in the reference pulse sequence is thus no longer a simple identification element, but also becomes a transmitting power tuning parameter.

According to a particular embodiment of the invention, the integer number of pulses included in any given reference sequence is selected from a predetermined set of integer numbers.

This embodiment of the invention will allow both the transmitter and the receiver to share a knowledge of a limited group of possible reference sequences to be used for communicating together, so that few or none additional messages will be needed for the transmitter and the receiver to adapt themselves to each other and to communication conditions affecting the wireless link established between them.

The integer numbers included in said predetermined set of integer numbers will advantageously be constituted by successive multiples of a same initial integer number, in order to allow the use of a very simple tuning process, as will be explained hereinafter. This initial integer number may advantageously be itself dynamically tunable in some specific embodiments.

According to a preferred embodiment of the invention, an initial signal transmission step is to be carried out by the transmitter by selecting an initial number of pulses for constituting an initial reference pulse sequence to be transmitted, the number of pulses constituting the reference pulse sequence being gradually increased for carrying out subsequent signal transmission steps until reception by the transmitter of an acknowledgement signal signifying that the last transmitted sequence has actually been received by its intended receiver.

The acknowledgement signal may be a signal specifically transmitted to that end by the receiver, but it may also be implicitly included in any other kind of signal transmitted by the receiver when said receiver will have entered in an operating mode, which will only be possible if said receiver has actually detected the reference pulse sequence.

The modulation of the UWB signals to be detected by carrying out such a signal detection step may result from various modulation schemes, an amplitude modulation by virtue of which the carried information will essentially be related to the power carried by these signals being particularly well-suited since it is easy to implement, which in turn enables to manufacture adapted transmitters at a relatively low cost.

According to one of its hardware-oriented aspects, the invention also relates to a telecommunication system including at least one transmitter and one receiver, said transmitter being intended to transmit a carrying signal formed by at least one reference sequence including an integer number of pulses dispatched over a same integer number of time windows, system in which the receiver includes signal detection means intended to compute at least one detection value representative of an amount of power carried by each pulse sequence and to compare said detection value to at least one predetermined threshold value, system including tuning means for tuning the integer number of pulses included in any given reference sequence.

According to a particular embodiment of this hardware-related aspect, the transmitter includes means for selecting, from a predetermined set of integer numbers, the integer number of pulses to be included in a given reference sequence to be transmitted.

A detection of a pulse sequence actually included in a transmitted signal may be performed by computing the detection value as a result of an integration of a square value of a signal picked up at the receiver end, which integration may be performed over a worst-case, continuous time duration. However, it appears more advantageous to restrict the actual integration process to time windows where a pulse might actually be expected, in order to spare computing resources.

According to a variant of this hardware-related aspect, the receiver will thus advantageously include means for selecting, from a predetermined set of integer numbers, the integer number of pulses to be included in a reference sequence expected to be received.

According to another of its hardware-oriented aspects, the invention also relates to a device intended to transmit a signal formed by at least one reference sequence including an integer number of pulses dispatched over a same integer number of time windows, which device includes symbol encoding means intended to multiply said reference sequence with at least one detection value, which device further includes tuning means for tuning the integer number of pulses included in a reference sequence to be transmitted by said device.

According to yet another of its hardware-oriented aspects, the invention also relates to a device intended to receive a signal formed by at least one reference sequence including an integer number of pulses dispatched over a same integer number of time windows, which device includes signal detection means intended to compute at least one detection value representative of an amount of power carried by each pulse sequence and to compare said detection value to at least one predetermined threshold value, which device further includes tuning means for tuning the integer number of pulses included in a reference sequence expected to be received by said device.

More generally, the invention also relates to a pulse sequence to be transmitted between a transmitter and a receiver, which pulse sequence includes an integer number of pulses dispatched over a same integer number of time windows, said number of pulses having been tuned by said transmitter in order to compensate for adverse communication conditions affecting a wireless link through which said sequence is to be transmitted.

As explained hereinbefore, the invention makes use of the number of pulses included in the reference pulse sequence as a transmitting power tuning parameter, said number of pulses thus no longer being only a simple feature of an identification code.

The characteristics of the invention mentioned above, as well as others, will emerge more clearly from a reading of the following description given in relation to the accompanying figures, amongst which:

BRIEF DESCRIPTION OF THE SEVERAL VIEWS OF THE DRAWINGS

FIG. 1 is a functional diagram depicting a telecommunication system in which the invention is used;

FIG. 2 is a chronogram depicting a pulse sequence constituting a carrying signal transmitted in such a telecommunication system;

FIG. 3 is a chronogram depicting a pulse model which may be used for generating such a sequence;

FIG. 4 is a chronogram depicting a data frame including a plurality of pulse sequences;

DETAILED DESCRIPTION OF THE INVENTION

Figure 5:
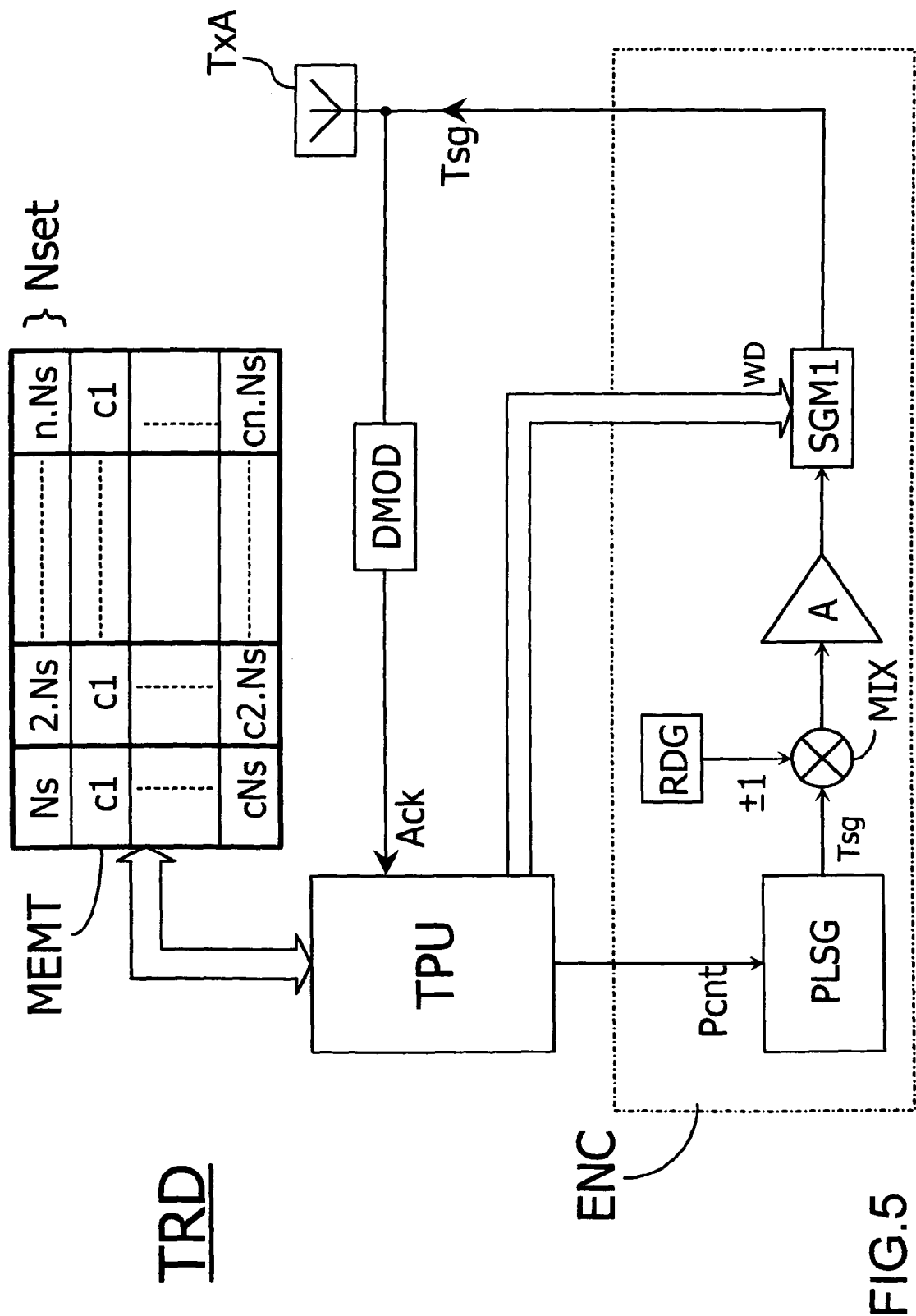
FIG. 5 is a block diagram depicting symbol encoding means included in a transmitter in which a variant of the invention is embodied.

FIG. 1 depicts a telecommunication system SYST in which the present invention is embodied. This system SYST includes at least one transmitter TRD and one receiver RCD, which may for example be both constituted by devices such as mobile phones. The transmitter TRD is intended to transmit a signal Tsg formed by at least one sequence of Ns pulses pj (for j=1 to Ns) over Ns time windows, each pulse being enclosed within a time chip whose position within its relevant time window is defined by a chip number cj (for j=1 to Ns). The number Ns of pulses included in this sequence may, for example, be chosen equal to 128, while the width of each time window may be chosen equal to 100 nanoseconds, with a width of 1 nanosecond for each time chip.

According to the particular embodiment of the present invention which will be described hereinafter, the transmitter TRD includes symbol encoding means ENC intended to multiply each pulse sequence by an integer value representative of a symbol to be carried by said pulse sequence, in order to perform an amplitude modulation of said pulse sequence.

The information carried by the transmitted signal Tsg will thus essentially be related to the power carried by this signal Tsg, which power is related to the amplitude of the pulses included within said signal Tsg. This information may then be recovered by the receiver RCD without said receiver RCD having to map precisely, with respect to time, the received pulse sequences.

To this end, the receiver RCD includes symbol detection means DEC intended to compute at least one detection value representative of an amount of power carried by each pulse sequence and to compare said detection value to at least one predetermined threshold value. As will be explained hereinafter, the result of such a comparison will automatically enable to differentiate an actually transmitted signal Tsg from noise generally affecting the related communication channel.

FIG. 2 depicts such a transmitted signal Tsg in the form of a chronogram, according to which each pulse sequence has a total duration Ts divided into time windows having each a duration Tf, each time window being sub-divided into time chips Tc, a single time chip within each window being intended to enclose a pulse pj (for j=1 to Ns), which single time chip is identified by means of a chip number cj. The transmitter of this transmitted signal Tsg will thus be identified by a signature Sg=(c1, c2 . . . cNs) jointly formed by all above-mentioned chip numbers cj (for j=1 to Ns), which signature Sg is in itself quite sturdy and may thus be reliably and accurately communicated to all potential receivers.

In this particular embodiment of the invention, each pulse pj (for j=1 to Ns) belonging to the pulse sequence shown in this picture has been multiplied by a same integer value Vi representative of a symbol to be carried by said pulse sequence, in the form of the power carried by this sequence, the reference "i" being indicative of a reference number allocated to the pulse sequence under consideration.

Furthermore, the pulses pj (for j=1 to Ns) are multiplied by values αj which are randomly chosen equal to +1 or −1 in the course of the symbol encoding step, so that in the example shown here, the second pulse p2 is negative.

Such a random distribution of positive and negative pulses, which does not affect the information carried by said pulses because said information is related to a square form of said pulses, allows to prevent appearance of high-amplitude peaks in the spectral domain, which peaks could interfere with equipment not included in the telecommunication system. Such frequency interference should be limited as a rule, and is targeted by a European Commission Directive 83/336 CEE, as well as by regulation of the USA's Federal Communications-Commission.

All pulses pj (for j=1 to Ns) of the pulse sequence shown here may additionally be submitted to a time jitter dti in the course of the symbol encoding step.

This time-jitter, introduced by time-delaying means, will be kept small with respect to a delay spread induced by a communication channel through which the modulated signal will be transmitted. The delay spread may have, for example, a value of 100 nanoseconds. Such a time-jitter won't affect the information carried by each pulse sequence, and mainly adds an optional degree of flexibility to the modulation scheme according to the invention.

The transmitted signal Tsg may thus be expressed in the following form:

$$Tsg(t) = \sum_{i,j} Vi \cdot \alpha j \cdot pj(t - cj - j \cdot Tf - dti)$$

FIG. 3 is another chronogram which depicts a possible shape p(t) which may be chosen for constituting the above-mentioned pulses. Pulses pj(t) (for j=1 to Ns) of a same sequence may have different shapes, provided that they all have essentially a same width and carry a same quantity of energy. All pulses pj(t) (for j=1 to Ns) belonging to a same sequence may, however, have a same shape such as the shape p(t) depicted here, which is defined as a derivative of the second order of a Gaussian function, which may be expressed mathematically as $p(t)=A.[1-4\pi(t/Tw)^2].\exp(-2\pi(t/Tw)^2)$. Other pulse shapes known to those skilled in the art may, of course, be used in this same purpose.

FIG. 4 is yet another chronogram which depicts a dataframe DF formed by successive pulse sequences such as the one described above, each having a total duration Ts, a guard interval GI being periodically inserted between two such sequences in order to prevent alteration of a given sequence by a following one, which alterations could be caused, for example, by intermodulation products between said pulse sequences. This dataframe DF is thus constituted by successive frames having each a duration Tr, with Tr=Ts+GI, and including each a pulse sequence as described above.

FIG. 5 diagrammatically shows symbol encoding means ENC included in a transmitter TRD according to a preferred variant of the invention. These symbol encoding means ENC are essentially constituted by a signal encoder including:
  a single pulse generator PLSG for producing a series of reference pulse sequences,
  a random binary generator RDG for randomly generating values equal to +1 or −1 with which successive pulses of a given reference pulse sequence Psq are to be multiplied by a mixer MIX,
  an amplifier A for boosting the output signal of said mixer MIX, and
  a signal multiplier SGM for multiplying each reference pulse sequence Psq with a tunable coding value representative of a symbol to be carried by said reference pulse sequence Psq, which tunable coding value is represented by a control word WD.

The signal multiplier SGM thus will generate encoded pulse sequences Tsg which will then be transmitted by means of an antenna device TxA.

In this embodiment of the invention, the pulse generator PLSG is controlled by a transmission processing unit TPU, which is provided with means for defining an integer number of pulses each reference pulse sequence Psq shall include, and for sending to the pulse generator PLSG a control signal Pcnt having a value representative of the integer number of pulses defined by the transmission processing unit TPU. The transmitter TRD thus includes means for selecting, by suitably shaping the control signal Pcnt, the integer number of pulses to be included in a given reference sequence to be transmitted.

In this embodiment of the invention, a predetermined set Nset of integer numbers Ns, 2.Ns . . . n.Ns is memorized in transmission memory means MEMR. In this specific case, said integer numbers are all integer multiples of a same initial number Ns.

The number and timing of the pulses constituting a given reference pulse sequence may for example be selected among the as follows:

During a first signal transmission step, the initial number Ns will be assumed by the transmission processing unit TPU to be sufficient to ensure detection of a corresponding reference sequence at the receiver end. The transmission processing unit TPU will thus extract from the transmission memory means MEMT all corresponding chip numbers c1 . . . cNs and will shape the control signal Pcnt accordingly, the encoding means being then intended to operate as already explained above.

If no acknowledgement signal Ack, be it explicit or implicit, is received via the transmission antenna device TxA and demodulation means DMOD in answer to a predetermined number of cyclic transmissions of the pulse sequence Tsg generated as described hereinbefore, the transmission processing unit TPU will infer the number of pulses it has used for constituting the reference pulse sequence has proven insufficient for said sequence to be detected at the receiver end. Consequently, the transmission processing unit TPU will select the immediately higher integer number $2.Ns$ included in the predetermined set of numbers Nset. The transmission processing unit RPU will then extract from the reception memory means MEMR all chip numbers $c1 \ldots c2.Ns$ corresponding to a new and longer reference pulse sequence, and will shape a new control signal Pcnt accordingly, in order to carry out another encoding step in the course of which the encoding means are intended to operate as already explained above.

The process described hereinbefore is to be carried out iteratively until an acknowledgement signal Ack is received by the transmitter, which will indicate that the number of pulses currently selected is sufficient for the according transmitted pulse sequence to be detected at the receiver end, which will mean that the current number is optimal for carrying out the communication since no smaller number is suitable for this purpose.

The acknowledgement signal may be a signal specifically transmitted to that end by the receiver, but it may also be implicitly included in any other kind of signal transmitted by the receiver and picked up by the antenna device TxA when said receiver will have entered in an operating mode, which will only be possible if said receiver has actually detected the current reference pulse sequence.

The transmission processing unit TPU may further include monitoring means (not shown) for monitoring the number of changes applied to the number of pulses included in the reference sequence, so as to stop the execution of the signal transmission step and/or re-start said execution on the basis of initial settings once a given maximal number of changes will have been reached, which maximal number may itself be dynamically tunable.

In a variant of the above-described embodiment, the encoding means ENC may include multiple signal encoders like the one shown in the present Figure and described hereinbefore, each of which signal encoders including a single pulse generator and multiple band-pass filters and signal multipliers. Such a variant may be especially useful for building a multi-network transmitter, each signal encoder included in such a transmitter being than dedicated to one of said networks.

Figure 6:
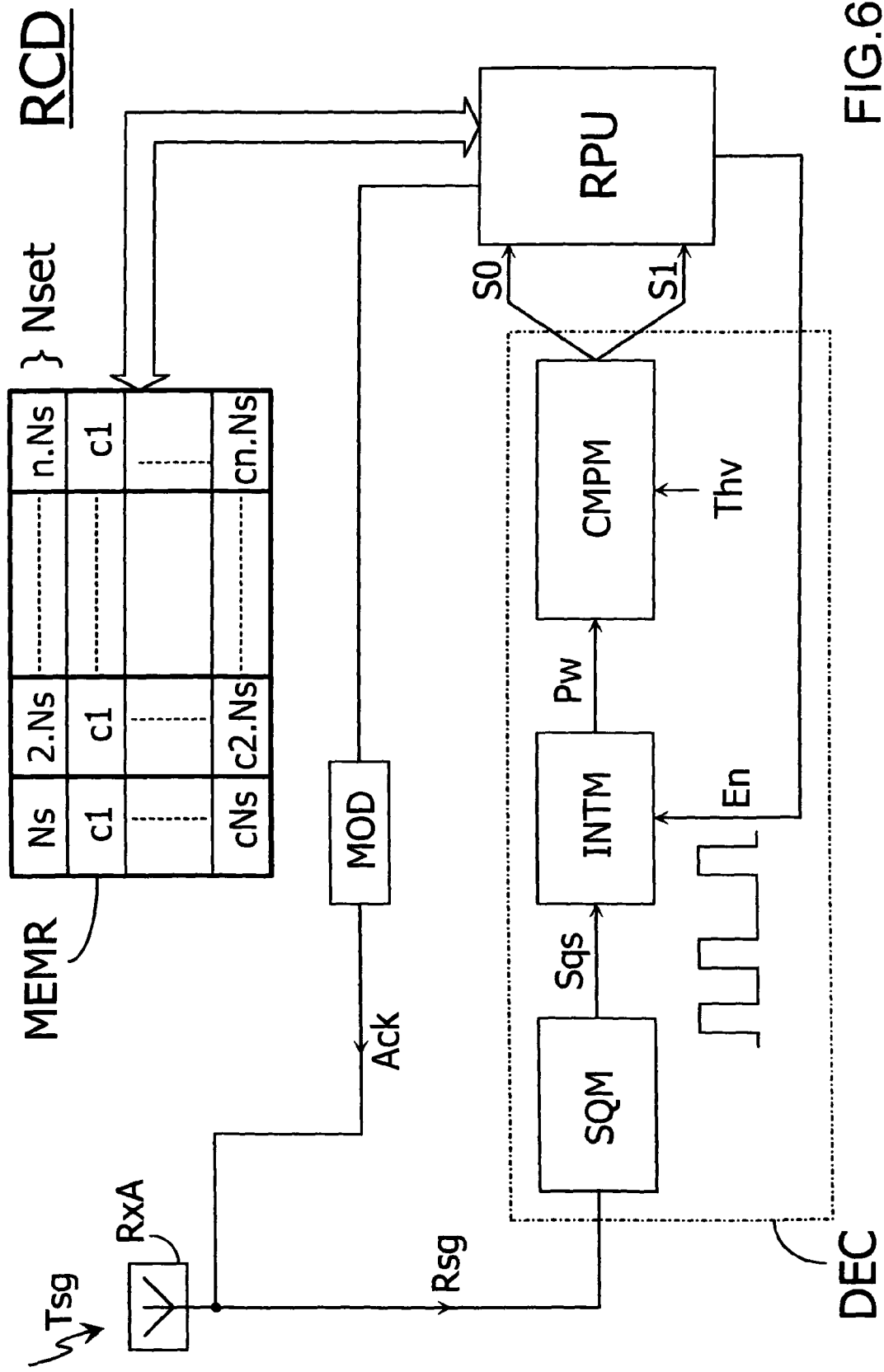
FIG. 6 is a block diagram depicting signal detection means included in a receiver in which a variant of the invention is embodied.

FIG. 6 depicts signal detection means DEC included in a receiver including a reception antenna device RxA intended to receive a transmitted signal Tsg as described hereinbefore, which transmitted signal Tsg is to include at least one reference pulse sequence, which may not have been subjected to a symbol encoding step at the transmitting end if it is sent solely for synchronization purposes.

In the embodiment of the invention depicted here, the signal detection means DEC include a squaring module SQM connected to the reception antenna device RxA and intended to be fed with a received signal Rsg provided by the reception antenna device RxA and to deliver a signal Sqs constituted by a square of said received signal Rsg.

The signal detection means DEC further include an integrating module INT connected to the squaring module SQM and intended to deliver a detection value Pw representative of an amount of power carried by any given pulse sequence included in the received signal Tsg. Such a detection value Pw may for example be computed as the integral, on the duration of the channel delay, of the square signal Sqs delivered by the squaring module SQM.

The signal detection means DEC also include a comparing module CMPM connected to the integrating module INT and intended to compare the detection value Pw to be delivered by said integrating module INT with at least one predetermined threshold value Thv.

The actual presence of a pulse sequence within the received signal Rsg will thus be identified in a very straightforward manner, according to a simple decoding grid which may be expressed as follows:

If Pw<Thv, no pulse sequence has been detected within the received signal Rsg, which is, in this embodiment, indicated by an active state featured by a first result signal S0;

and

If Th<Pwv, a pulse sequence has been detected within the received signal Rsg, which is, in this embodiment, indicated by an active state featured by a second result signal S1.

In this particular embodiment of the invention, the integrating module INT is only activated during active states of an enabling signal En, for example a logic level "1" which controls an activation transistor switch of a power source of said integrating module INT. The shape of the enabling signal En thus defines an integration pattern, and is adapted so as to include one or more series of time windows whose respective positions are defined by the chip numbers of an expected reference sequence. The receiver RCD thus includes means for selecting, by suitably shaping the enabling signal En, an integer number of pulses to be included in a reference sequence expected to be received.

Integrating the received signal over a preselected series of time windows enables to restrict the use of computing power for detection and demodulation purposes to those instants where pulses are actually expected.

The time windows defined by the enabling signal En have a total number which will have been tuned in order to compensate for communication conditions currently affecting the wireless link through which the transmitted signal Tsg has been picked up. Such a tuning is to be performed by a reception processing unit RPU, according to a predetermined tuning scheme of which an example may be described as follows:

A predetermined set Nset of integer numbers Ns, $2.Ns \ldots n.Ns$ has been memorized beforehand in reception memory means MEMR. In this specific case, said integer numbers are all integer multiples of a same initial number Ns. During a first signal detection step, this initial number Ns will be assumed by the reception processing unit RPU to actually be the number of pulses chosen at the transmitting end and thus included in a single reference pulse sequence. The reception processing unit RPU will thus extract from the reception memory means MEMR all corresponding chip numbers $c1 \ldots cNs$ of the expected pulse sequence and will shape an enabling signal En accordingly, the decoding means being then intended to operate as already explained above.

If the detection value Pw is higher than the threshold value Thv, the reception processing unit RPU will deliver an acknowledgement signal Ack to modulation means MOD, in order for said acknowledgement signal Ack to be fed back to the original transmitter via the reception antenna device RxA so that said original transmitter will know that the number of pulses it has used for constituting the reference pulse sequence has proven sufficient for said sequence to be detected at the receiver end. Conversely, as long as the detection value Pw will remain lower than the threshold value Thv, the reception processing unit RPU will deliver no acknowledgement signal Ack. After a predetermined time interval will have elapsed without the detection value Pw having risen above the threshold value Thv, the reception processing unit RPU will assume the currently selected number of pulses to be insufficient and will then select the immediately higher integer number 2.Ns included in the predetermined set of numbers Nset. The reception processing unit RPU will then extract from the reception memory means MEMR all chip numbers $c_1 \ldots c_{2.Ns}$ corresponding to the new and longer expected pulse sequence, and will shape an enabling signal En accordingly, in order to carry another detection step in the course of which the detection means are intended to operate as already explained above.

The reception processing unit RPU may further include monitoring means (not shown) for monitoring the number of changes applied to the number of pulses included in the expected pulse sequence, so as to stop the execution of the signal detection process and/or re-start said execution on the basis of initial settings once a given maximal number of changes will have been reached, which maximal number may itself be dynamically tunable.

Various methods may be used by those skilled in the art for defining and computing the threshold value Thv, which should preferably take into account a non-linear processing to be performed in the course of the signal detection step, which will involve specific statistical models of unquantifiable parameters such as thermal noise, interference cause by other transceivers, etc.

The squaring module SQM may be formed by a Gilbert cell intended to be fed with identical input signals. The integrating module INT may be formed by an operational amplifier provided with an RC feedback. The comparing module CMPM may be formed by an operational amplifier intended to receive the detection value Pw and the threshold value Thv. The signal detection means DEC may thus be formed by off-the-shelf analog circuits, which analog circuits are known for their high processing speed and do not require any sampling, as opposed to digital solutions, which will enable to further reduce the processing power and the time required for performing a signal decoding step according to this embodiment of the invention.

Figure 7:
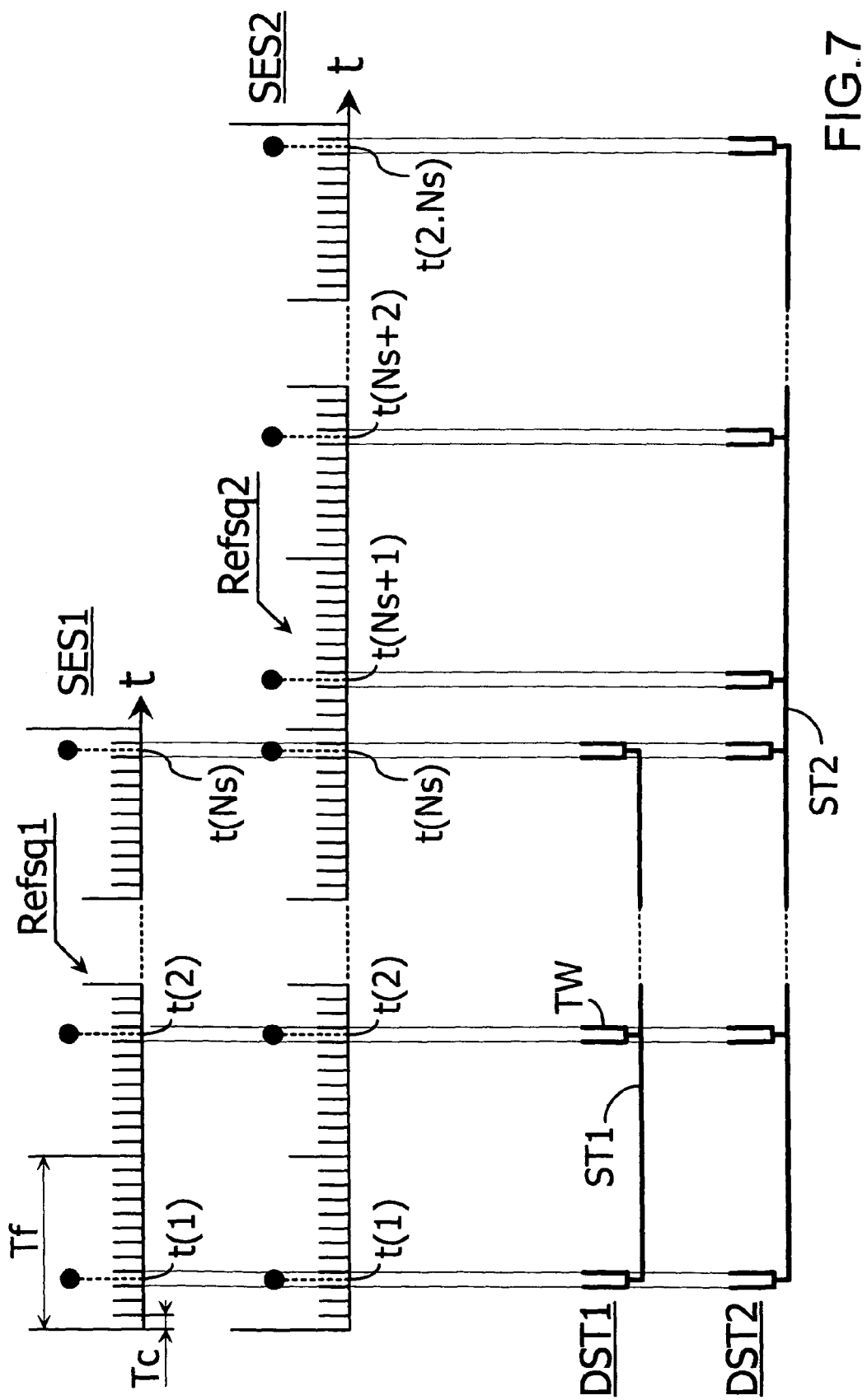
FIG. 7 is a series of chronograms depicting a preferred embodiment of signal transmission and decoding steps allowing to adjust the number of pulses included in a reference pulse sequence according to the invention.

FIG. 7 depicts first and second reference pulse sequences Refsq1 and Refsq2 which will successively be transmitted in order to enable a receiver to synchronize itself on one of said reference pulse sequences Refsq1 and Refsq2. During a first signal transmission step SES1, a first reference pulse sequence Refsq1 including Ns pulses is generated and transmitted by the transmitter in accordance with the explanations given hereinbefore. Each of said Ns pulses occurs at a predetermined instant $t(1), t(2) \ldots (Ns)$ which is already known to the receiver, which receiver is to carry out a first signal detection step DST1 as described above. The receiver will thus integrate the received signal during a first predetermined series ST1 of time windows TW centered on said predetermined instants $t(1), t(2) \ldots t(Ns)$, in order to compute a first detection value as defined above and to compare this first detection value to a minimal threshold value. In the example given here, the first detection value happens to be lower than the threshold value, so that no acknowledgement will be issued by the receiver to the transmitter. Said transmitter will then increase the number of pulses included in the reference sequence by generating a second reference sequence Refsq2 whose length is, in this example, the double of that of the first reference sequence Refsq1. Each of the 2.Ns pulses of the second reference sequence Refsq2 occurs at a predetermined instant $t(1), t(2) \ldots t(Ns), t(Ns+1), t(Ns+2) \ldots t(2.Ns)$ which is already known to the receiver, which will then carry out a second signal detection step DST2 by integrating the received signal during a second predetermined series ST2 of time windows TW centered on said predetermined instants $t(1), t(2) \ldots (Ns), t(Ns+1), t(Ns+2) \ldots t(2.Ns)$. In this particular example, a concatenation of two first reference pulse sequences Refsq1 happens to yield enough pulses for the energy carried by the resulting second reference pulse sequence Refsq2 to become detectable by the receiver, which will be made known to the original transmitter by means of an acknowledgement signal.

By virtue of the invention, further signal transmission, detection and decoding steps may then be carried out by directly using the same reference pulse sequence Refsq2, which will have been selected as comprising a minimal number of pulses and yet being detectable, which in turn will enable to optimize the processing costs of said further signal detection and decoding steps, since the computation time linked to subsequent integrations over a time duration defined by said reference pulse sequence Refsq2 will thus be kept as low as possible while allowing a suitable detection and demodulation of the received signals.

The invention claimed is:

1. A method for transmitting data in a telecommunication system including at least one transmitter and one receiver, comprising:

transmitting, from said transmitter, an initial signal formed by at least one reference sequence including an initial integer number of pulses dispatched over a same integer number of time windows;

receiving, at the receiver, the initial signal transmitted by the transmitter;

computing, at the receiver, at least one detection value representative of an amount of power carried by the received signal;

comparing, at the receiver, the computed detection value to at least one predetermined threshold value;

tuning, with a processing unit at the transmitter, a second integer number of pulses included in a second reference sequence, said second integer number being larger than the initial integer number, wherein the integer number of pulses included in any given reference sequence is selected from a predetermined set of integer numbers; and transmitting, from said transmitter, a second signal formed by the second reference sequence including the second integer number of pulses dispatched over an additional integer number of time windows associated with the second integer number of pulses, wherein the second integer number of pulses is a successive multiple of the initial integer number of pulses.

2. A telecommunication system, comprising:

at least one transmitter; and at least one receiver, wherein said transmitter is configured to transmit an initial signal formed by at least one reference sequence including an initial integer number of pulses dispatched over a same integer number of time windows, the receiver includes a signal detection unit configured to compute at least one detection value representative of an amount of power carried by the at least one reference sequence in the initial signal and to compare said detection value to at least one predetermined threshold value, said transmitter is configured to tune a second integer number of pulses included in a second reference sequence, said second integer number being larger than the initial integer number, wherein the transmitter includes a processor configured to select the integer number of pulses to be included in any given reference sequence from a predetermined set of integer numbers, the transmitter is configured to transmit a second signal formed by the second reference sequence including the second integer number of pulses dispatched over an additional integer number of time windows associated with the second integer number of pulses, and the second integer number of pulses is a successive multiple of the initial integer number of pulses.

3. The telecommunication system as claimed in claim 2, wherein the receiver includes a processor configured to select, from a predetermined set of integer numbers, an integer number of pulses expected to be included in a reference sequence received from the transmitter.

4. A telecommunications transmitting device, comprising:
an encoder configured to generate an initial signal formed by at least one reference sequence including an initial integer number of pulses dispatched over a same integer number of time windows;
a transmitter configured to transmit the initial signal to a receiver; and
a processing unit configured to tune a second integer number of pulses included in a second reference sequence, said second integer number being larger than the initial integer number, wherein
the transmitter includes a processor configured to select the integer number of pulses to be included in any given reference sequence from a predetermined set of integer numbers,
the transmitter is configured to transmit a second signal formed by the second reference sequence including the second integer number of pulses dispatched over an additional integer number of time windows associated with the second integer number of pulses, and
the second integer number of pulses is a successive multiple of the initial integer number of pulses.

5. A telecommunications receiving device, comprising:
a signal detection unit configured to compute at least one detection value representative of an amount of power carried by each pulse sequence in an initial signal including an initial reference sequence received from a transmitter based on an initial integer number of pulses expected to be included in the initial reference sequence;
a comparator configured to compare said detection value to at least one predetermined threshold value; and
a processor configured to select a second integer number of pulses, which is higher than the initial integer number of pulses, from a predetermined set of integer numbers, which are expected to be included in another reference sequence received from the transmitter subsequent to the initial signal over an additional integer number of time windows associated with the second integer number of pulses, wherein
the second integer number of pulses is a successive multiple of the initial integer number of pulses.

6. The telecommunications receiving device of claim 5, further comprising:
an integrating unit configured to integrate a signal received from the transmitter including the another reference sequence over a number of time windows corresponding to the second integer number of pulses, larger than the initial integer number of pulses, expected to be included in the reference sequence received from the transmitter.

* * * * *